May 21, 1935.  W. M. BACON, JR  2,002,427
ELECTRICALLY DRIVEN LURE CARRIAGE AND TRACKAGE THEREFOR
Filed Aug. 1, 1934   3 Sheets-Sheet 1

Willard M.Bacon Jr.,
INVENTOR
BY Victor J.Evans&Co.
ATTORNEY

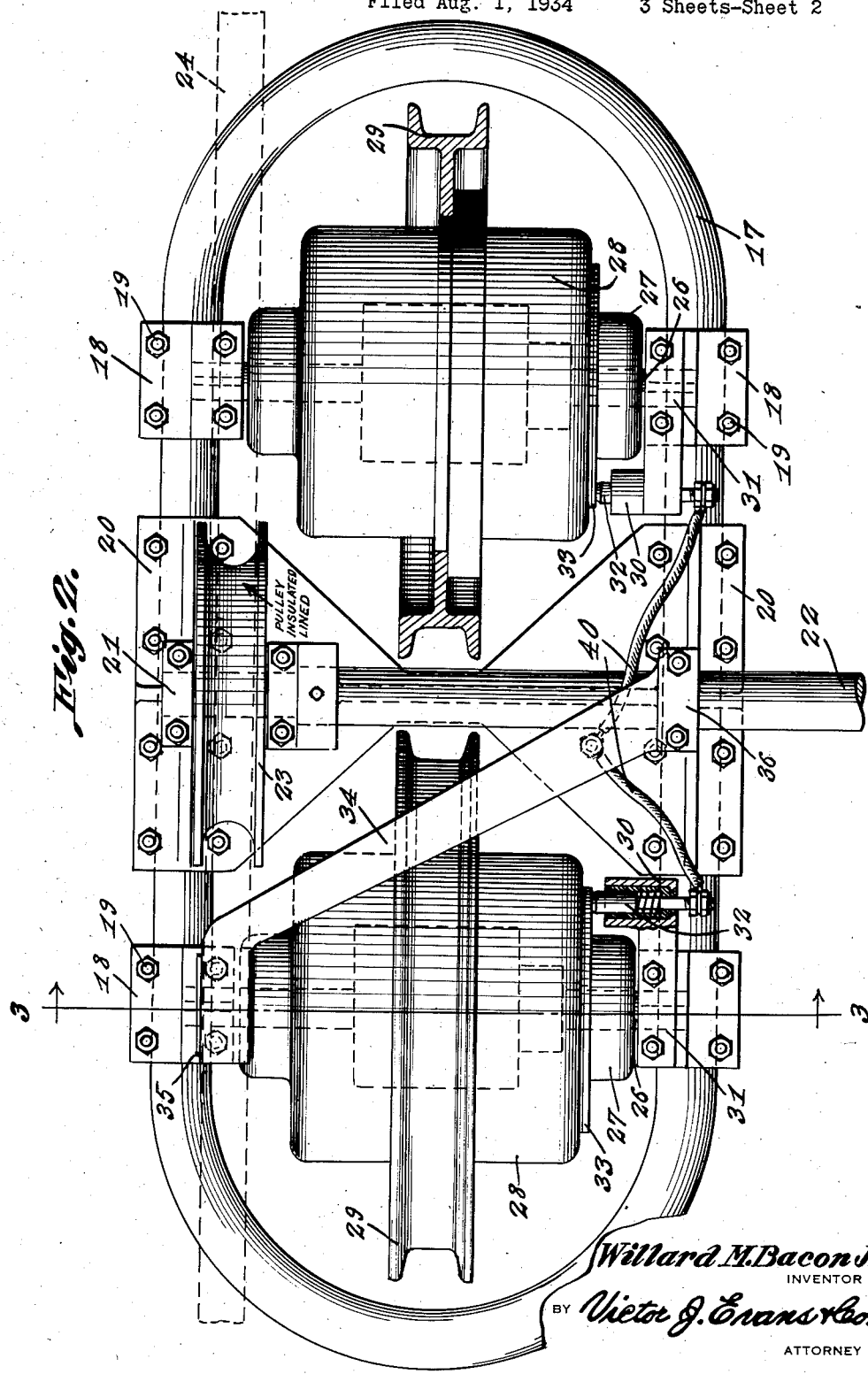

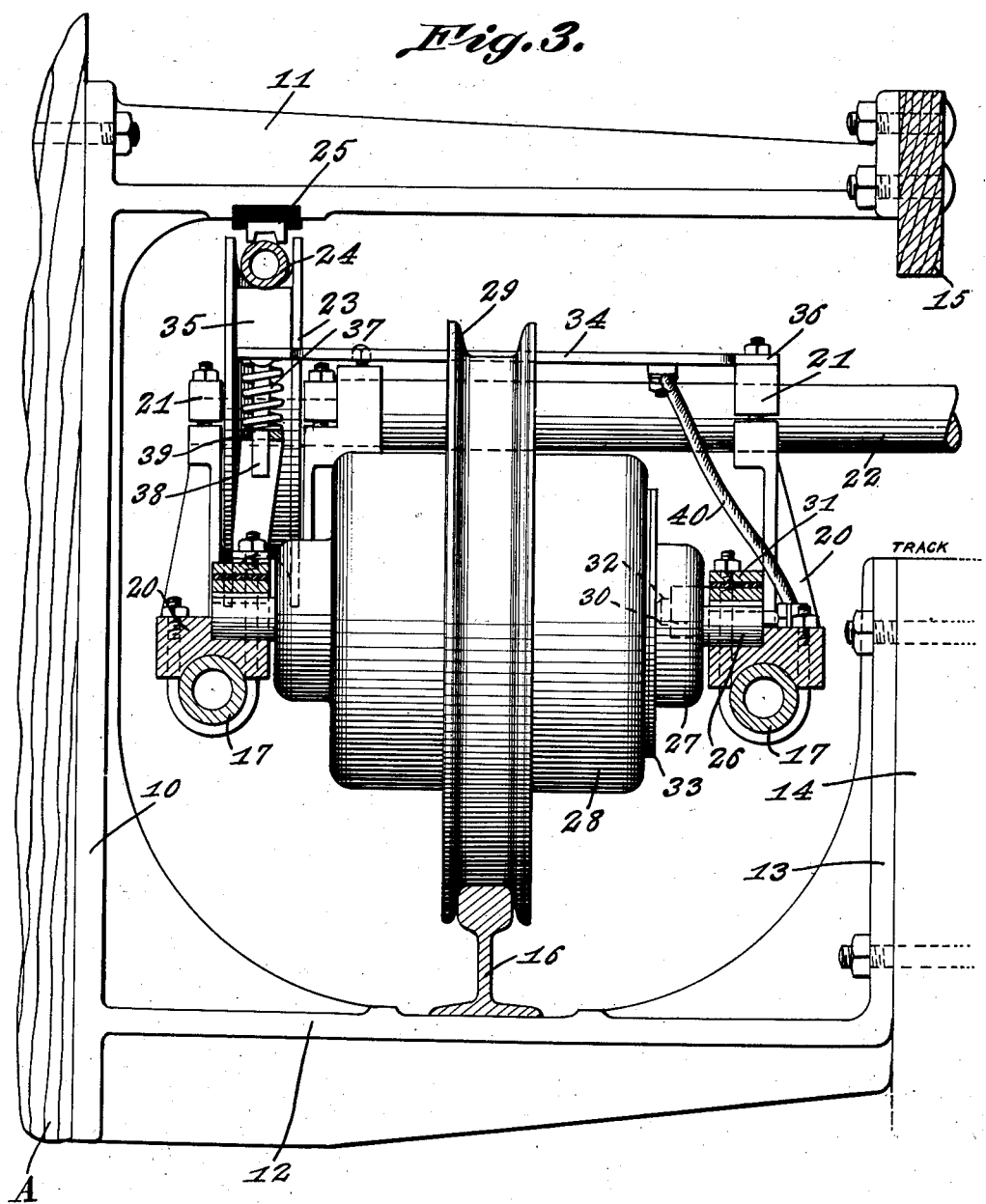

Patented May 21, 1935

2,002,427

UNITED STATES PATENT OFFICE 2,002,427

ELECTRICALLY DRIVEN LURE CARRIAGE AND TRACKAGE THEREFOR

Willard M. Bacon, Jr., Miami, Fla., assignor to J. Homer Ellis and E. J. O'Hare, both of Chicago, Ill.

Application August 1, 1934, Serial No. 738,003

4 Claims. (Cl. 104—121)

The invention relates to an electrically propelled lure carriage and more especially to an electrically driven lure carriage and trackage therefor.

The primary object of the invention is the provision of mechanism of this character, wherein the traction wheels of the lure carriage are driven from the rotor field of an electric motor, the armature of said motor being stationarily supported in the carriage and the mechanism being of novel construction to assure successful operation when built in a racing track for dogs.

Another object of the invention is the provision of mechanism of this character, wherein the carriage has therein fore and aft electric motors, these directly driving the traction wheels of such carriage upon a track, the track being of a monorail type, and the said carriage being sustained in traveling relation to the track and suspending a lure for dog racing purposes.

A further object of the invention is the provision of mechanism of this character which is comparatively simple in construction, thoroughly reliable and efficacious in its purpose, strong, durable, positive of operation, and inexpensive to manufacture and install.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:

Figure 2 is a top plan view partly in section.

Figure 3 is a sectional view on the line 3—3 of Figure 2 looking in the direction of the arrows.

Similar reference characters indicate corresponding parts throughout the several views in the drawings.

Figure 1:
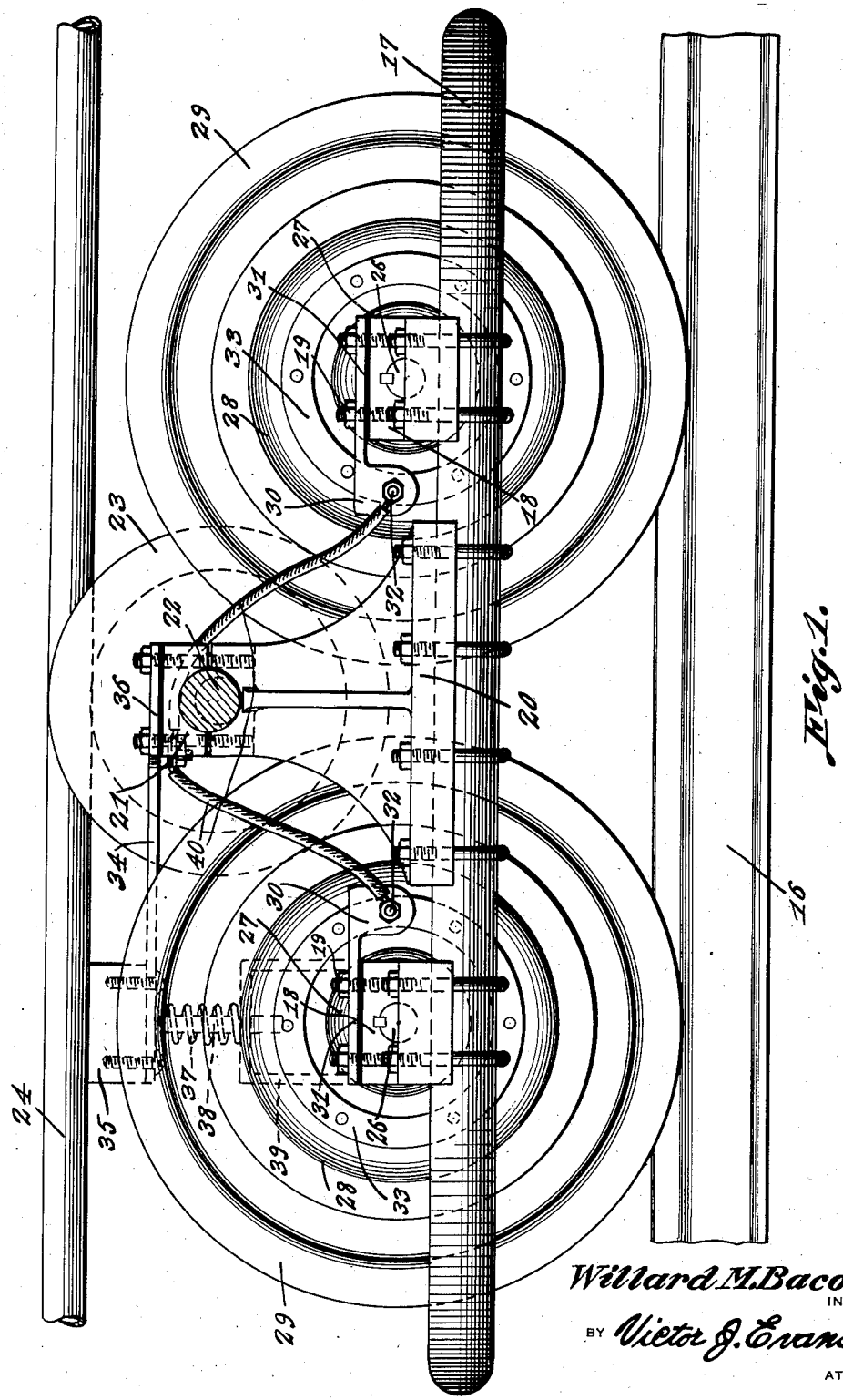
Figure 1 is a fragmentary vertical longitudinal sectional view showing a lure carriage and trackage therefor in accordance with the invention.

Referring to the drawings in detail, A designates a portion of a vertical support which may be a post, wall or the like, and upon the same is mounted one of a series of brackets, each including a base web 10 and the upper and lower arms 11 and 12, respectively, these being extended laterally from the web at the required distance from each other and in parallel relation one to the other. The lower arm 12 has an upstanding end 13 to which is attached the track foundation or bed 14, only a portion thereof being shown in Figure 1 of the drawings, the track being used for dog racing. On the arm 11 is fitted a guard 15 which overhangs the outer edging of the track 14.

Arranged within the bracket and upon the lower arm 12 is a monorail 16 forming the track for a lure carriage. This lure carriage comprises an oval tubiform frame 17 having fore and aft thereof the oppositely disposed bearings 18, these being saddled upon the sides of the frame 17 and made secure by clips 19.

The frame 17, between the bearings 18, carries uprights 20 formed with split head bearings 21 for accommodating a lure arm 22, the latter supporting the lure in the nature of a rabbit or the like (not shown) for traversing about the track 14. Upon this arm 22 is journaled a guide wheel 23 in the nature of a pulley wheel for engaging an electric current conductor 24, the same being insulated, as at 25, from and carried by the upper arm 11 of the bracket. The wheel 23 is insulated in any suitable manner from the lure arm 22.

Keyed or otherwise made stationary in the bearings 18 on the frame 17 are the trunnions 26 of a fixed armature 27 of an electric motor, the rotor field 28 of this motor being rotatable about the armature 27 and having integrally formed therewith a traction wheel 29 engaging the track 16, the trunnions 26 being insulated from brush holders 30, as at 31, and these holders being detachably secured upon the said bearings at one side of the frame 17. The brushes 32 in these holders 30 engage contact rings 33 carried by the rotor field 28 of the motor for electrical connection of such motor, the ground connection being had through the track 16.

Upon one of the heads 20 and disposed diagonally with respect to the frame 17 is fixed the spring arm 24 carrying a wiper shoe 35 for the conductor 24, the arm 34 being insulated, at 36, from the said head 20 to which it is attached, and the shoe 35 is maintained in wiping contact with the conductor 24 through the medium of a tensioning spring 37 encircling a guide pin 38 depending from the arm 34 immediately beneath the shoe 35 and this pin operates in a guide 39 suitably supported by one of the bearings 18 and insulated therefrom. The arm 34 has attached thereto the electric leads 40 to the respective brushes 32, so that an electric circuit will be completed from the conductor 24 to the motor and the ground had through the rail 16.

It should be apparent that the carriage is driven from the several motors through the rotor fields 28, these having the traction wheels 29 movable upon the monorail 16 for the driving of the lure as supported from the lure arm 22 about the track 14 for dog racing events.

What is claimed is:

1. The combination of a monorail track, an electric conductor rail supported above the track, a carriage having a lure support, electric motors fitted in said carriage and having stationary armatures and rotor fields, wheels driven by the rotor fields of said motors and traversing the monorail track, a guide roller journaled on the lure support and insulated therefrom and engageable with the conductor, a resilient wiper shoe engaging said conductor, contact rings carried by the rotor fields of said motors, and brushes carried by the carriage and connected with the wiper shoe and engaged with said contact rings for completing an electric circuit between the conductor and the monorail track.

2. The combination of a monorail track, an electric conductor rail supported above the track, a carriage having a lure support, electric motors fitted in said carriage and having stationary armatures and rotor fields, wheels driven by the rotor fields of said motors and traversing the monorail track, a guide roller journaled on the lure support and insulated therefrom and engageable with the conductor, a resilient wiper shoe engaging said conductor, contact rings carried by the rotor fields of said motors, brushes carried by the carriage and connected with the wiper shoe and engaged with said contact rings for completing an electric circuit between the conductor and the monorail track, and means for maintaining the shoe in constant wiping engagement with the conductor.

3. The combination of a bracket having spaced upper and lower arms, an electric conductor rail supported by the upper arm and insulated therefrom, a monorail track supported by the lower arm of the bracket, a carriage movable between the arms of said bracket and having a lure support, electric motors fitted in said carriage and having stationary armatures and rotor fields, wheels driven by the rotor fields of said motors and traversing the monorail track, a guide roller journaled on the lure support and insulated therefrom and engageable with the conductor, a resilient wiper shoe engaging said conductor, contact rings carried by the rotor fields of said motors, brushes carried by the carriage and connected with the wiper shoe and engaged with said contact rings for completing an electric circuit between the conductor and the monorail track, means for maintaining the shoe in constant wiping engagement with the conductor, and a racing track joined with the lower arm of the bracket.

4. The combination of a bracket having spaced upper and lower arms, an electric conductor rail supported by the upper arm and insulated therefrom, a monorail track supported by the lower arm of the bracket, a carriage movable between the arms of said bracket and having a lure support, electric motors fitted in said carriage and having stationary armatures and rotor fields, wheels driven by the rotor fields of said motors and traversing the monorail track, a guide roller journaled on the lure support and insulated therefrom and engageable with the conductor, a resilient wiper shoe engaging said conductor, contact rings carried by the rotor fields of said motors, brushes carried by the carriage and connected with the wiper shoe and engaged with said contact rings for completing an electric circuit between the conductor and the monorail track, means for maintaining the shoe in constant wiping engagement with the conductor, a racing track joined with the lower arm of the bracket, and a guard carried by the upper arm of the bracket and overhanging the outer edge of said racing track.

WILLARD M. BACON, Jr.